US012748311B2

(12) United States Patent
Ding et al.

(10) Patent No.: US 12,748,311 B2

(45) Date of Patent: Sep. 29, 2026

(54) GLASSES AND LENS ANTENNA THEREOF

(71) Applicant: GOERTEK TECHNOLOGY CO., LTD., Qingdao (CN)

(72) Inventors: Ziheng Ding, Qingdao (CN); Kenichiro Kodama, Qingdao (CN); Katsumi Saito, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 19/242,045

(22) Filed: Jun. 18, 2025

(65) Prior Publication Data

US 2025/0314892 A1 Oct. 9, 2025

Related U.S. Application Data

(63) Continuation of application No. PCT/CN2024/109460, filed on Aug. 2, 2024.

(30) Foreign Application Priority Data

Aug. 7, 2023 (CN) ........................ 202310988383.7

(51) Int. Cl.
*G02B 27/01* (2006.01)

(52) U.S. Cl.
CPC ..... *G02B 27/0172* (2013.01); *G02B 27/0176* (2013.01); *G02B 2027/0178* (2013.01)

(58) Field of Classification Search
CPC ............ G02B 27/0172; G02B 27/0176; G02B 2027/0178
See application file for complete search history.

(56) References Cited

U.S. PATENT DOCUMENTS

| | | | | |
|---|---|---|---|---|
| 5,020,150 | A | 5/1991 | Shannon | |
| 12,412,983 | B2 * | 9/2025 | Hanninen | H01Q 5/49 |
| 2001/0028326 | A1 * | 10/2001 | Pretorius | H01Q 21/0075 343/846 |
| 2005/0088342 | A1 * | 4/2005 | Parsche | H01Q 9/0464 343/700 MS |
| 2012/0169990 | A1 | 7/2012 | Burnstein | |

(Continued)

FOREIGN PATENT DOCUMENTS

| | | |
|---|---|---|
| CN | 103168390 A | 6/2013 |
| CN | 103858354 A | 6/2014 |

(Continued)

OTHER PUBLICATIONS

International Search Report and Written Opinion in Corresponding International Application No. PCT/CN2024/109460, mailed Nov. 21, 2024; 14 pgs.

(Continued)

*Primary Examiner* — Temesghen Ghebretinsae

(74) *Attorney, Agent, or Firm* — HAUPTMAN HAM, LLP

(57) ABSTRACT

The lens antenna is provided in the glasses, and includes a feed sheet and an annular region. The feed sheet is configured to perform excitation feeding in the first frequency band to excite the annular region to produce a first resonance point. A capacitive coupling gap is provided between the annular region and the feed sheet. The annular region is provided around the edge of the lens, and a first gap provided at a designated position of the annular region. The feed sheet is fixed to the edge area of the lens.

8 Claims, 7 Drawing Sheets

(56) References Cited

U.S. PATENT DOCUMENTS

| | | | | |
|---|---|---|---|---|
| 2017/0117615 | A1* | 4/2017 | Choon | H01Q 9/0457 |
| 2019/0379121 | A1* | 12/2019 | Choon | H01Q 1/38 |
| 2022/0171218 | A1 | 6/2022 | Sakuma et al. | |
| 2022/0373346 | A1* | 11/2022 | Abhishek | G01C 21/3453 |
| 2023/0006368 | A1* | 1/2023 | Yang | H01Q 25/00 |
| 2023/0077278 | A1* | 3/2023 | Goncalves | G06Q 30/0631 |
| 2023/0121025 | A1* | 4/2023 | Choe | H05K 1/0277 361/749 |
| 2023/0169745 | A1* | 6/2023 | Karadayi | G06F 16/188 345/419 |
| 2023/0244755 | A1* | 8/2023 | Hlavac | G06F 3/017 345/633 |
| 2023/0288705 | A1* | 9/2023 | Wang | G02B 27/0172 |
| 2023/0299470 | A1* | 9/2023 | Jenkins | B29C 64/112 343/718 |
| 2023/0402736 | A1* | 12/2023 | Zhu | H01Q 13/10 |
| 2024/0061170 | A1* | 2/2024 | Wei | G02B 6/12004 |
| 2025/0118887 | A1* | 4/2025 | Ugwu | H01Q 1/48 |

FOREIGN PATENT DOCUMENTS

| | | | | |
|---|---|---|---|---|
| CN | 106972240 | A | 7/2017 | |
| CN | 110581347 | A | 12/2019 | |
| CN | 110635223 | A | 12/2019 | |
| CN | 110945410 | A | 3/2020 | |
| CN | 210129077 | U | 3/2020 | |
| CN | 111656606 | A | 9/2020 | |
| CN | 111864346 | A | 10/2020 | |
| CN | 112713386 | A | 4/2021 | |
| CN | 113039481 | A | 6/2021 | |
| CN | 113422197 | A | 9/2021 | |
| CN | 115421317 | A | 12/2022 | |
| CN | 116995423 | A | 11/2023 | |
| WO | 2012086619 | A1 | 6/2012 | |
| WO | WO-2023068588 | A1 * | 4/2023 | H01Q 1/27 |

OTHER PUBLICATIONS

First Office Action in Corresponding Chinese Application No. 202310988383.7, dated Jun. 4, 2026; 16 pgs.

* cited by examiner

GLASSES AND LENS ANTENNA THEREOF

CROSS-REFERENCE TO RELATED APPLICATIONS

The present application is a continuation application of International Application No. PCT/CN2024/109460, filed on Aug. 2, 2024, which claims priority to Chinese Patent Application No. 202310988383.7, filed on Aug. 7, 2023. The disclosures of the above-mentioned applications are incorporated herein by reference in their entireties.

TECHNICAL FIELD

The present application relates to the technical field of communication, and in particular to a glasses and a lens antenna thereof.

BACKGROUND

Currently, some augmented reality (AR) glasses are equipped with transparent lens antennas, which are antennas designed on transparent lens using transparent metals such as metal grids. This solution can realize the function of an antenna without taking up extra space.

However, transparent metal materials such as metal grids and indium tin oxide are not completely transparent. That is, the transparent metal material located in the middle of the transparent lens will still affect the optical properties of the lens to a certain extent, thereby affecting the visual effect of users using AR glasses.

In addition, transparent metal materials will affect the transmittance of the lens. The higher the transmittance of transparent metal materials, the less likely they are to be detected by the human eye, but the metal loss is higher, resulting in lower antenna efficiency. Metal grid is a low-cost and widely used implementation method. In order to improve the conductivity of the metal grid and ensure antenna efficiency, reducing the spacing between grid lines is a common method, but this may cause light diffraction. That is, as the spacing becomes smaller, when light passes through the metal grid, diffraction will occur, and dark spots or dark lines will appear, causing the image seen by the user to be blurred.

In summary, how to effectively design the lens antenna to ensure the user's visual effect is a technical problem that persons skilled in the art urgently need to solve.

SUMMARY

The present application is to provide a glasses and a lens antenna thereof, so as to effectively design the lens antenna and ensure the visual effect of the user.

In order to solve the above technical problems, the present application provides the following technical solutions.

The present application provides a lens antenna for glasses, including:

- an annular region provided around an edge of a lens; and
- a feed sheet configured to perform excitation feeding in a first frequency band to excite the annular region to generate a first resonance point,
- a capacitive coupling gap is provided between the annular region and the feed sheet, a first gap is provided at a designated position of the annular region, and the feed sheet is fixed at an edge area of the lens.

In an embodiment, the feed sheet is further configured to generate a second resonance point when operating as a monopole in a second frequency band.

In an embodiment, the feed sheet is strip-shaped, one end of the feed sheet is provided at a side edge area of the lens, and another end of the feed sheet is configured to extend along a side of the lens toward a bottom of the lens.

In an embodiment, a portion of the feed sheet provided at the side edge area of the lens adopts a solid metal conductor structure, and a portion of the feed sheet extending along the side of the lens toward the bottom of the lens adopts a transparent metal grid structure.

In an embodiment, the lens antenna further includes a first matching branch connected to the feed sheet and provided in an extension direction of the feed sheet, and the first matching branch is the transparent metal grid structure, is fixed to the edge area of the lens, and is configured to perform impedance matching in the first frequency band.

In an embodiment, the lens antenna further includes a second matching branch connected to the feed sheet and provided in a direction perpendicular to the extension direction of the feed sheet, the second matching branch is the transparent metal grid structure, is fixed to the edge area of the lens, and is configured to perform impedance matching in the second frequency band; and the feed sheet is further configured to generate a second resonance point when operating as the monopole in the second frequency band.

In an embodiment, the lens antenna further includes a first capacitor loading branch connected to the annular region and configured to tune the first resonance point, the first capacitor loading branch is the transparent metal grid structure, is in a strip shape, and is fixed to the side edge area of the lens.

In an embodiment, the lens antenna further includes a second capacitor loading branch connected to the annular region and the first capacitor loading branch and configured to tune the first resonance point,

- the second capacitor loading branch is the transparent metal grid structure, is in the strip shape, and is fixed at a bottom edge area of the lens;
- a width of the second capacitor loading branch is greater than a width of the first capacitor loading branch;
- a length direction of the first capacitor loading branch is an extension direction of the first capacitor loading branch, and a width direction of the first capacitor loading branch is perpendicular to the length direction of the first capacitor loading branch; and
- a length direction of the second capacitor loading branch is an extension direction of the second capacitor loading branch, and a width direction of the second capacitor loading branch is perpendicular to a length direction of the second capacitor loading branch.

In an embodiment, the first gap is provided at a designated position of a bottom of the annular region, and the second capacitor loading branch is provided with a second gap at the same position.

The present application further provides a glasses including the lens antenna as described above.

The present application takes into account that the human eye, as a visual organ, usually has an observation range of plus or minus 60 degrees in the horizontal direction and plus or minus 40 degrees in the vertical direction, and that the vision of the human eye decreases rapidly as the angle expands. That is to say, although the human eye can see objects within a wide angle range, the clarity will be greatly reduced. The lens antenna in the solution of the present application is as far away from the optical display area as possible, so that the solution of the present application can retain the original optical properties of the lens as much as possible, which effectively guarantees the visual effect of the user.

Specifically, in the solution of the present application, the annular region is provided around the edge of the lens, which will not affect the optical properties of the lens. There is a capacitive coupling gap between the annular region and the feed sheet. The feed sheet can be excited and fed in the first frequency band to excite the annular region to generate the first resonance point. It can be seen that the function of the lens antenna can be realized through the feed sheet and the annular region. The feed sheet of the present application is also fixed to the edge area of the lens, so that the optical properties of the lens are little affected, which is conducive to ensuring the visual effect of the user.

In addition, the present application takes into account that the traditional solution uses the entire lens region to design the lens antenna because it is convenient to adjust the shape, size and position of each component so that the designed lens antenna can easily reach the required resonance point. In the solution of the present application, the annular region is limited to be set around the edge of the lens, and the feed sheet also needs to be fixed in the edge area of the lens. In addition, the present application also takes into account that different users require different lens sizes, resulting in different lengths of the annular region. Therefore, in order to enable the lens antenna of the present application to reach the required resonance point, the solution of the present application is provided with a first gap at a specified position of the annular region, and the position of the first gap will affect the value of the first resonance point. In other words, when the length of the annular region is different due to lenses of different sizes, the solution of the present application can adapt. That is, by selecting a suitable specified position of the annular region to set the first gap, the lens antenna of the present application can still reach the required first resonance point, ensuring the flexibility of the solution.

In summary, the lens antenna of the present application has little effect on the optical properties of the lens, which is beneficial to ensuring the visual effect of the user. Moreover, for lenses of different sizes, the lens antenna of the present application can easily reach the required first resonance point.

BRIEF DESCRIPTION OF THE DRAWINGS

In order to more clearly illustrate the embodiments of the present application or the technical solutions in the related art, the drawings required for use in the embodiments or the description of the related art will be briefly introduced below. Obviously, the drawings described below are only some embodiments of the present application. For persons skilled in the art, other drawings can be obtained based on these drawings without paying creative efforts.

DETAILED DESCRIPTION OF THE EMBODIMENTS

The present application is to provide a lens antenna that has little effect on optical properties and is conducive to ensuring the visual effect of users. Moreover, for lenses of different sizes, the lens antenna of the present application can easily reach the required first resonance point.

In order to enable persons skilled in the art to better understand the present application, the present application is further described in detail below in conjunction with the accompanying drawings and detailed description. Obviously, the described embodiments are only part of the embodiments of the present application, rather than all of the embodiments. Based on the embodiments in the present application, all other embodiments obtained by persons skilled in the art without making creative efforts are within the scope of the present application.

Figure 1:
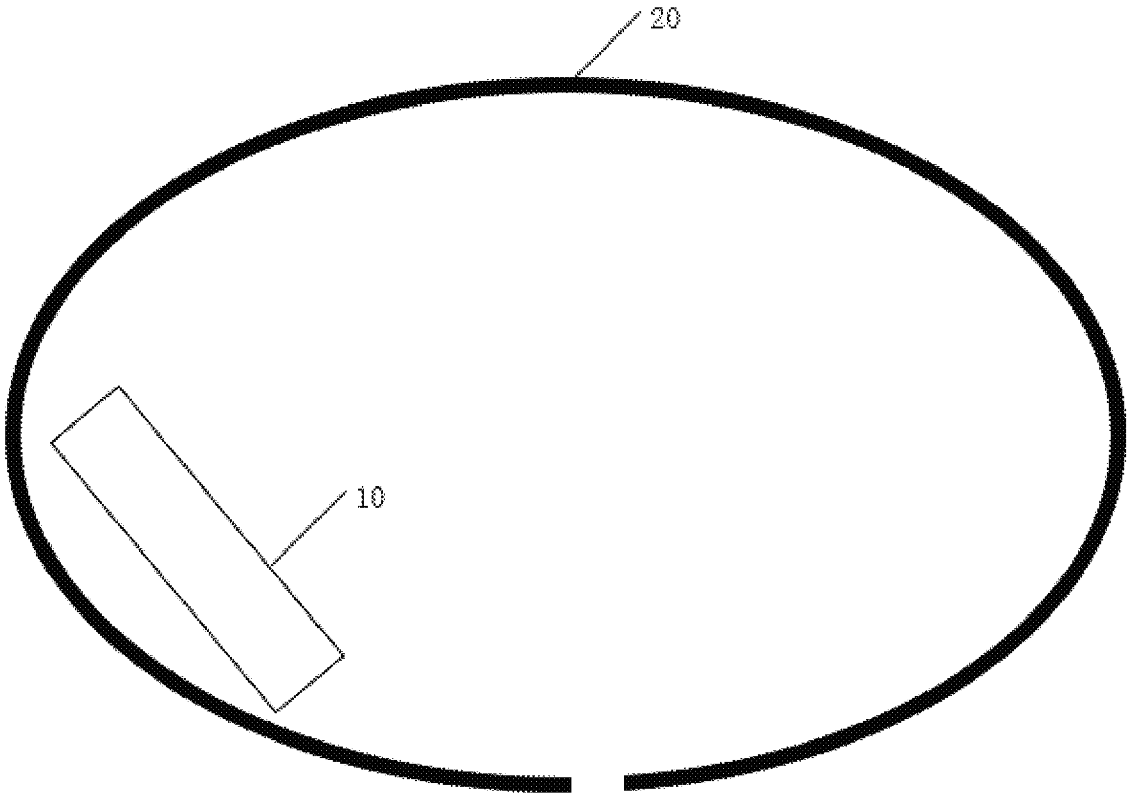
FIG. 1 is a schematic structure diagram of a lens antenna of the present application.

As shown in FIG. 1, which is a schematic structure diagram of a lens antenna of the present application. The lens antenna is arranged in the glasses, and the lens antenna includes a feed sheet 10 and an annular region 20.

The feed sheet 10 is configured to perform excitation feeding in a first frequency band to excite the annular region 20 to generate a first resonance point.

A capacitive coupling gap is provided between the annular region 20 and the feed sheet 10.

The annular region 20 is disposed around the edge of the lens, and a first gap is provided at a designated position of the annular region 20. The feed sheet 10 is fixed to the edge area of the lens.

Specifically, in the solution of the present application, the feed sheet 10 is configured to perform excitation feeding in the first frequency band, and the first frequency band is usually a low frequency band, that is, the feed sheet 10 can play the role of exciting the annular region 20 to generate a low frequency resonance point. The frequency range specifically corresponding to the first frequency band can be set and adjusted as needed, for example, it is usually in the frequency range of 2 GHz to 2.5 GHz. Similarly, the specific value of the first resonance point can be set and adjusted according to actual needs. But it can be understood that the frequency value of the first resonance point should fall within the first frequency band.

The shape and size of the feed sheet 10 can be set and adjusted according to actual needs, for example, it can be set to a rectangular shape or an arc shape. It should be emphasized that in order to reduce the impact on the optical characteristics of the lens and ensure the visual effect of the user, the feed sheet 10 should be fixed to the edge area of the lens.

The feed sheet 10 is fixed to the edge area of the lens. There are many specific fixing methods. For example, the feed sheet 10 can be pressed on the surface of the lens using a frame. For example, a groove can be specially provided in the lens for the feed sheet 10 to be placed. In practical applications, the most convenient fixing method is to fix it by gluing. And because the annular region 20 also needs to be fixed, in practical applications, the annular region 20 and the feed sheet 10 are usually fixed to the corresponding positions of the lens by gluing.

For example, in a specific scenario, a super polyethylene terephthalate (S-PET) film with a thickness of 100 μm is used to achieve gluing, that is, one side of the S-PET film has glue and can be pasted on the lens, while the other side is used to attach the feed sheet 10 and the annular region 20. Similarly, the first matching branch 30, the second matching branch 40, the first capacitor loading branch 50 and the second capacitor loading branch 60 described in the following embodiments can all be attached to the corresponding positions of the S-PET film, thereby being fixed at the corresponding positions of the lens through the S-PET film.

S-PET film is transparent and colorless, and will not affect the optical properties of the lens. In addition, S-PET film has high heat resistance and has the advantage of allowing low temperature reflow soldering.

The annular region 20 of the present application is configured to couple with the feed sheet 10. In the first frequency band, the annular region 20 can generate a first resonance point through the excitation feeding of the feed sheet 10. The gap between the annular region 20 and the feed sheet 10 is referred to as a capacitive coupling gap in the present application.

In order not to affect the optical properties of the lens, the annular region 20 is provided around the edge of the lens. So it can be understood that the shape of the annular region 20 is roughly consistent with the shape of the edge of the lens. In addition, it should be noted that when the annular region 20 is provided around the edge of the lens, the plane where the annular region 20 is located can be parallel to or coincide with the plane where the lens is located. For example, in one of the above occasions, the feed sheet 10, the annular region 20 and other components are attached to the S-PET film, and the S-PET film is pasted on the lens. In this occasion, the feed sheet 10, the annular region 20 and other components are in the same plane, which is also the plane where the annular region 20 is located, and the plane is parallel to the plane where the lens is located. In some occasions, it can also be set that the plane where the annular region 20 is located coincides with the plane where the lens is located, which is equivalent to the annular region 20 being arranged around the thickness surface of the lens. In practical applications, a more convenient implementation method is the aforementioned implementation method using S-PET film gluing.

The length of the annular region 20 will affect the value of the first resonance point, and it is understandable that different users may need glasses of different sizes, and glasses of different sizes also mean different lengths of the annular region 20. In order to enable the lens antenna of the present application to reach the required resonance point, the present application sets a first gap at a specified position of the annular region 20, and the position of the first gap is different, which will correspondingly affect the value of the first resonance point. In other words, when the length of the annular region 20 is different due to lenses of different sizes, the scheme of the present application can set the first gap by selecting a suitable specified position of the annular region 20, so that the lens antenna of the present application can still reach the required first resonance point.

In practical applications, the feed sheet 10 is usually provided in the side edge area of the lens. At this time, when the first gap is set at the bottom position of the annular region 20, it will have a greater impact on the first resonance point. Therefore, in the embodiment of FIG. 1, the first gap is set at the bottom position of the annular region 20 to achieve the adjustment of the first resonance point, that is, by selecting the first gap position, the first resonance point reaches an ideal value.

In addition to the position of the first gap affecting the first resonance point, the width of the first gap will also have a certain impact on the first resonance point, but the impact of the first gap width is lower than the impact of the position. Therefore, in actual applications, after determining the length of the annular region 20, the setting of the first gap position is equivalent to achieving a coarse adjustment effect of the first resonance point, and the setting of the first gap width is equivalent to achieving a fine adjustment effect of the first resonance point. Of course, in the following embodiments, the adjustment of the first resonance point can also be achieved in conjunction with other implementation methods.

In an embodiment of the present application, the feed sheet 10 can further configured to generate a second resonance point when operating as a monopole in a second frequency band.

With the rapid development of wireless communications, a single communication method is difficult to meet the needs of users. Mobile communication devices often require the ability to have multiple communication methods, such as the ability to have high-band WiFi communication, and the ability to have low-band WiFi communication, Bluetooth communication, and 4G/5G communication, which requires the antenna to cover multiple working frequency bands.

As an emerging mobile communication device, AR glasses also need to have broadband communication capabilities in some situations to meet different communication function requirements. In traditional solutions, multi-mode antenna solutions are usually adopted. For example, most of them use a combination of dipole/monopole/loop antennas of different lengths to produce multiple working frequency bands or broadband effects. However, the existing broadband antenna is more complex in structure, has lower efficiency when used as a transparent lens antenna, and has a greater impact on optical properties. It is easily noticed by users, reducing the user experience.

In this embodiment of the present application, in addition to being configured to excite the annular region 20 to produce a first resonance point, the feed sheet 10 itself can also operate in the second frequency band to produce a second resonance point. That is, the feed sheet 10 is used as a monopole at this time, which not only improves the bandwidth but also does not increase the structural complexity. Therefore, the shortcomings of affecting optical characteristics and reducing antenna efficiency in traditional solutions will not occur.

The second frequency band is usually a high frequency band, that is, the feed sheet 10 can work as a monopole in the high frequency band. The specific frequency range corresponding to the second frequency band can be set and adjusted as needed, for example, it is usually in the frequency range of 5 GHz to 7 GHz. Similarly, the specific value of the second resonance point can be set and adjusted according to actual needs, but it can be understood that the frequency value of the second resonance point should fall within the second frequency band.

In an embodiment of the present application, the feed sheet 10 is strip-shaped, and one end of the feed sheet 10 is provided at the side edge area of the lens, and the other end extends along the side of the lens toward the bottom of the lens.

When the feed sheet 10 is used as an excitation source and excitation feeding is performed in the first frequency band, the first resonance point is mainly determined by the length of the annular region 20, and the feed sheet 10 can play a role in impedance matching.

In order to enable the feed sheet 10 to achieve an ideal impedance matching effect, the feed sheet 10 is usually not too short, and the feed sheet 10 needs to be fixed at the edge area of the lens as described above, that is, the position requirement of the feed sheet 10 will limit the shape of the feed sheet 10. Therefore, in this embodiment, a strip-shaped feed sheet 10 is selected, and one end of the feed sheet 10 is provided at the side edge area of the lens, and the other end extends along the side of the lens toward the bottom of the lens, so that the feed sheet 10 can have a certain length. And because it starts from the side edge area of the lens and extends along the side of the lens toward the bottom of the lens, the optical properties of the lens are slightly affected, that is, the requirement that the feed sheet 10 needs to be fixed at the edge area of the lens can be met.

Figure 2:
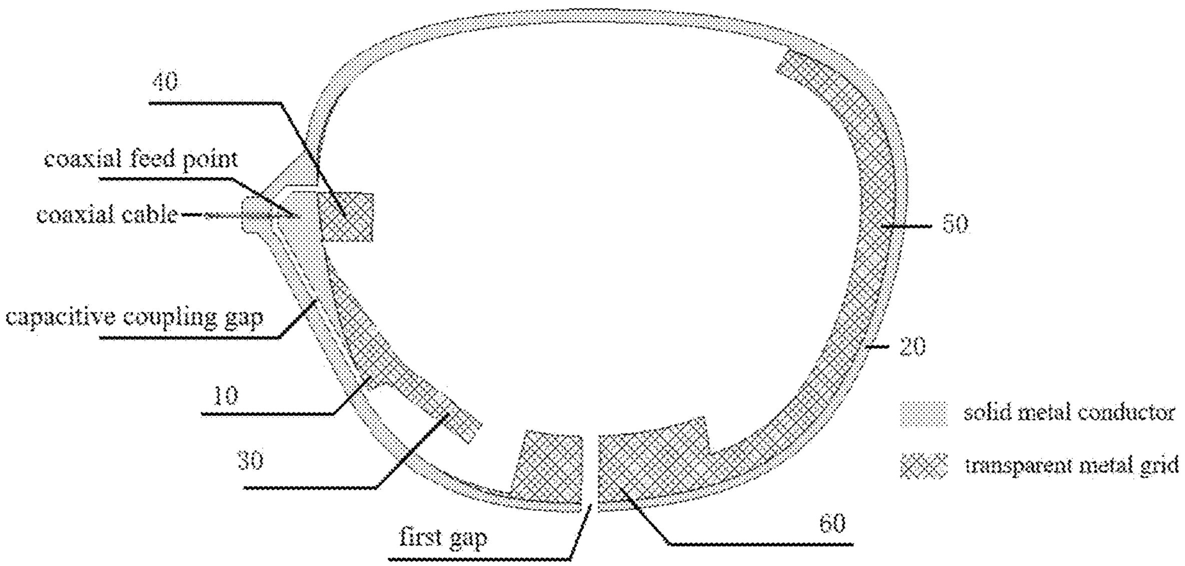
FIG. 2 is a schematic structure diagram of a lens antenna according to an embodiment of the present application.

In the embodiments of FIG. 1 and FIG. 2 below, the feed sheet 10 is a strip-shaped feed sheet 10, and one end of the feed sheet 10 is provided at the side edge area of the lens, and the other end extends along the side of the lens toward the bottom of the lens. For example, in one occasion, the length of the feed sheet 10 can be 15 mm.

Furthermore, in an embodiment of the present application, as shown in FIG. 2, the portion of the feed sheet 10 provided in the side edge area of the lens adopts a solid metal conductor structure, and the portion of the feed sheet 10 extending along the side of the lens toward the bottom of the lens adopts a transparent metal grid structure.

This embodiment takes into account that the portion of the feed sheet 10 provided in the side edge area of the lens has almost no effect on the optical properties of the lens. Therefore, the feed sheet 10 in this portion can adopt a solid metal conductor structure, that is, the feed sheet 10 in this portion is pure metal, which is beneficial to ensure the efficiency of the antenna.

The portion of the feed sheet 10 extending along the side of the lens toward the bottom of the lens will affect the optical properties of the lens to a certain extent. In this embodiment, in order to reduce this influence, a transparent metal grid structure is adopted for this portion.

In the embodiment of FIG. 2, this embodiment is adopted, and the feed sheet 10 is composed of a solid metal conductor portion and a transparent metal grid portion. For example, the line width of the transparent metal grid is set to 6 μm, the line thickness is set to 2 μm, and the line spacing is set to 130 μm. Since the transparent metal grid part of the feed sheet 10 is still in the edge area of the lens, and the metal grid is transparent, it is difficult for the human eye to detect. In actual applications, the solid metal conductor portion of the feed sheet 10 usually overlaps with the frame because it is too edge, that is, after the frame is installed, the pure metal portion of the feed sheet 10 is usually hidden inside the frame, and will not affect the optical properties at all.

In an embodiment of the present application, the lens antenna may further include a first matching branch 30.

The first matching branch 30 is connected to the feed sheet 10 and is provided in the extension direction of the feed sheet 10.

The first matching branch 30 adopts a transparent metal grid structure and is fixed to the edge area of the lens. The first matching branch 30 is configured to perform impedance matching in the first frequency band.

This embodiment takes into account that the first matching branch 30 is set in the extension direction of the feed sheet 10, which is equivalent to a series inductor, can offset part of the capacitance introduced by the capacitive coupling feed and improve the impedance matching performance in the low frequency band, that is, the first matching branch 30 can be configured to perform impedance matching in the first frequency band. The length of the first matching branch 30 can also be set and adjusted as needed. For example, in one occasion, the length of the first matching branch 30 can be set to 8.6 mm.

Since the first matching branch 30 is provided in the extension direction of the feed sheet 10, in order to reduce the influence on the optical characteristics, in addition to fixing the first matching branch 30 at the edge area of the lens, the first matching branch 30 also needs to adopt a transparent metal grid structure.

Figure 3:
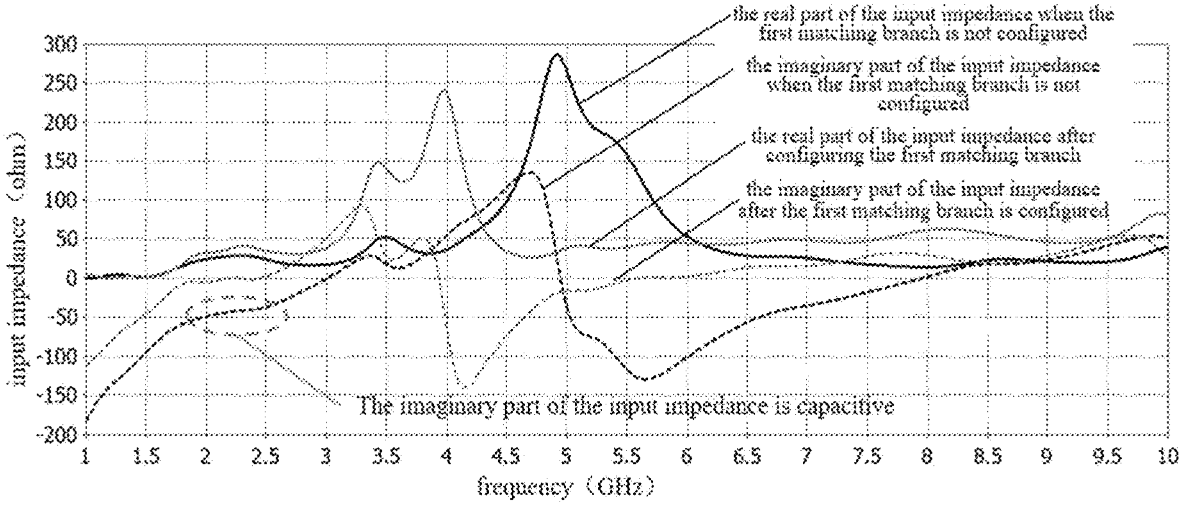
FIG. 3 is a comparative schematic diagram according to an embodiment in which the first matching branch is not added and after the first matching branch is added.

As shown in FIG. 3, which is a comparative schematic diagram according to an embodiment in which the first matching branch 30 is not added and after the first matching branch 30 is added. It can be seen from the imaginary part of the input impedance that when the first matching branch 30 is not set, the imaginary part of the input impedance is about −50 ohms within the first frequency band, which is capacitive. While after the first matching branch 30 is set, the imaginary part of the input impedance reaches an ideal value of about 0 ohms.

In an embodiment of the present application, the lens antenna may further include a second matching branch 40.

The second matching branch 40 is connected to the feed sheet 10 and is provided in a direction perpendicular to the extension direction of the feed sheet 10.

The second matching branch 40 adopts a transparent metal grid structure and is fixed to the edge area of the lens. The second matching branch 40 is configured to perform impedance matching in the second frequency band.

The feed sheet 10 is further configured to generate a second resonance point when operating as a monopole in the second frequency band.

This embodiment takes into account that in some embodiments, the feed sheet 10 also needs to be used as a monopole in the high frequency band. Therefore, in this embodiment, a second matching branch 40 is provided in the extension direction perpendicular to the feed sheet 10, which is equivalent to a parallel capacitor, and can offset part of the capacitance in the high frequency input impedance, thereby improving the impedance matching characteristics of the antenna in the second frequency band, that is, the second matching branch 40 can be configured to perform impedance matching in the second frequency band.

Since the second matching branch 40 is provided in a direction perpendicular to the extension direction of the feed sheet 10, in order to reduce the impact on the optical properties, in addition to fixing the second matching branch 40 on the edge area of the lens, the second matching branch 40 also needs to adopt a transparent metal grid structure.

It is also understandable that the extension direction of the second matching branch 40 is toward the middle area of the lens, so in practical applications, the second matching branch 40 cannot be set too long. For example, in the case of FIG. 2, the second matching branch 40 is a shorter rectangle, such as 4.4 mm.

Figure 4:
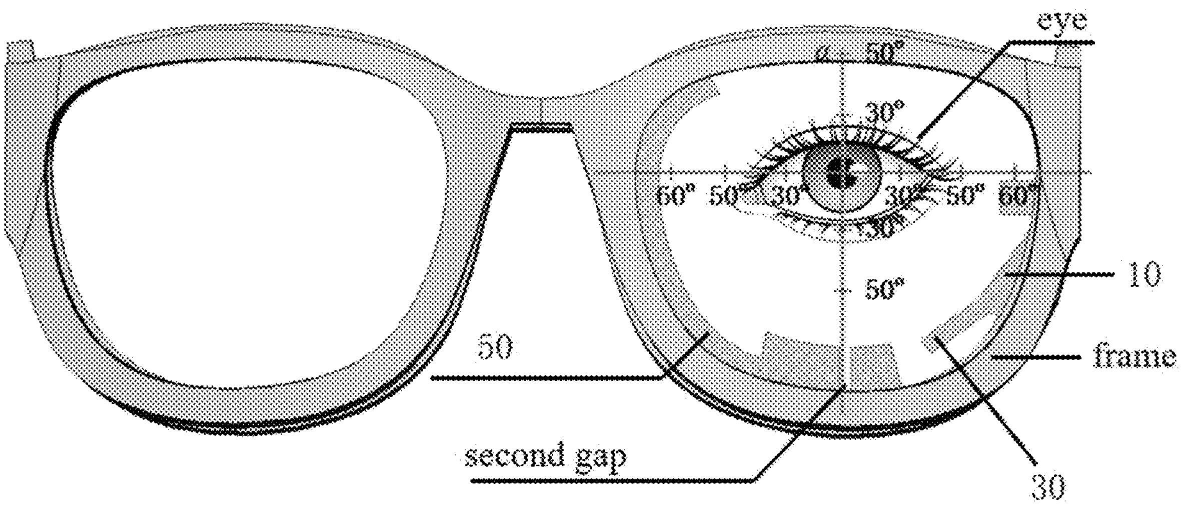
FIG. 4 is a front view of a lens antenna according to an embodiment of the present application.

As shown in FIG. 4, which is a front view of a lens antenna according to an embodiment of the present application. As a visual organ, the human eye has an observation range of plus or minus 60 degrees in the horizontal direction and plus or minus 40 degrees in the vertical direction. In addition, as the angle expands, the vision of the human eye also decreases rapidly. For example, when the horizontal angle reaches 60 degrees, the vision of the human eye drops to less than one-tenth of 0 degrees. That is to say, although the human eye can see objects within a wide angle range, the clarity will be greatly reduced. As can be seen from FIG. 3, the feed sheet 10, the first matching branch 30 and the second matching branch 40 of the present application are all located outside the horizontal angle of −60° to 60° and the vertical angle of −40° to 40°, which shows that the lens antenna of the present application is extremely difficult to be detected by the human eye and will not affect the optical properties. In other words, when setting the position of the feed sheet 10, the first matching branch 30 and the second matching branch 40, whether they are fixed in the edge area of the lens should be based on whether they exceed the observation range of the human eye as the standard for setting the position of each component.

In addition, in the above-mentioned embodiment, the first matching branch 30 and the second matching branch 40 adopt a transparent metal grid structure, and in the following embodiment, the first capacitor loading branch 50 and the second capacitor loading branch 60 also adopt a transparent metal grid structure. In actual application, in order to facilitate production and manufacturing, the specific grid sizes adopted in these transparent metal grid structures can be the same. Of course, the grid size of a certain component can also be adjusted as needed, which will not affect the implementation of the present application.

In addition, in practical applications, the structure of these transparent metal grids can be various pore types such as square holes, round holes, etc., which will not affect the implementation of the present application.

In an embodiment of the present application, the lens antenna may further include a first capacitor loading branch 50.

The first capacitor loading branch 50 is connected to the annular region 20 for tuning the first resonance point.

The first capacitor loading branch 50 adopts a transparent metal grid structure, and the first capacitor loading branch 50 is in a long strip shape and is fixed to the side edge area of the lens.

As described above, a first gap is provided at a specified position of the annular region 20, and the position and width of the first gap can be adjusted, that is, both can affect the first resonance point. In this embodiment, in order to further improve the flexibility of tuning, a first capacitor loading branch 50 connected to the annular region 20 for tuning the first resonance point is also provided.

In order not to affect the optical properties, the first capacitor loading branch 50 is fixed to the side edge area of the lens and adopts a transparent metal grid structure. In addition, in order to ensure that the first capacitor loading branch 50 can have a certain length, the first capacitor loading branch 50 can be set to a long strip.

In addition, it can be understood that, as described above, the feed sheet 10 is usually also provided in the side edge area of the lens. Therefore, when it is necessary to set the first capacitor loading branch 50, the feed sheet 10 and the first capacitor loading branch 50 can be provided at the left and right sides of the lens respectively. And in actual applications, considering that the feed sheet 10 needs to be connected to the radio frequency device through a coaxial cable, the first capacitor loading branch 50 is usually provided at the side close to the nose, and the feed sheet 10 is provided at the side close to the ear, so as to facilitate the wiring of the feed sheet 10. This embodiment is adopted in FIG. 2. The coaxial feed point on the feed sheet 10 is marked in FIG. 2, that is, the position where the feed sheet 10 is used to connect the coaxial cable. In actual applications, in order to ensure the firmness of the connection and the reliable conductive effect, the feed sheet 10 is usually welded to the coaxial cable. Correspondingly, the annular region 20 is also usually welded to the coaxial cable.

For example, in the case of FIG. 2, the inner conductor of the coaxial cable can be connected to the feed sheet 10 by low temperature welding, and the outer conductor of the coaxial cable can be connected to the U-shaped ring by low temperature welding. The U-shaped ring described here refers to the part of the annular region 20 used to connect the coaxial cable, which can be set to a U-shaped structure, so that it has a larger surface area to facilitate welding.

In addition, according to the formula $R=\rho\times L/(W\times h)$, $\rho$ is the conductivity, L is the conductor length, and $W\times h$ reflects the cross-sectional area of the conductor. The larger the cross-sectional area of the conductor, the more conducive it is to ensuring the antenna efficiency. As described above, the annular region 20 of the present application is arranged around the edge of the lens. Therefore, the annular region 20 can usually adopt a solid metal conductor, which will not affect the optical properties and is conducive to ensuring the efficiency of the lens antenna of the present application.

In an embodiment of the present application, the lens antenna may further include a second capacitor loading branch 60.

The second capacitor loading branch 60 is connected to the annular region 20 for tuning the first resonance point.

The second capacitor loading branch 60 adopts a transparent metal grid structure, and the second capacitor loading branch 60 is in a long strip shape and is fixed at the bottom edge area of the lens.

The width of the second capacitor loading branch 60 is greater than the width of the first capacitor loading branch 50.

The length direction of the first capacitor loading branch 50 represents the extension direction of the first capacitor loading branch 50, and the width direction of the first capacitor loading branch 50 is perpendicular to the length direction of the first capacitor loading branch 50. The length direction of the second capacitor loading branch 60 represents the extension direction of the second capacitor loading branch 60, and the width direction of the second capacitor loading branch 60 is perpendicular to the length direction of the second capacitor loading branch 60.

This embodiment takes into account that in order to further improve the flexibility of tuning, in addition to setting up the first capacitor loading branch 50 for tuning the first resonance point, a second capacitor loading branch 60 for tuning the first resonance point can be further set in the extension direction of the first capacitor loading branch 50.

Similarly, in order not to affect the optical properties, the second capacitor loading branch 60 is fixed to the bottom edge area of the lens and adopts a transparent metal grid structure. In addition, in order to ensure that the second capacitor loading branch 60 can have a certain length, the second capacitor loading branch 60 can usually be set to a long strip.

The difference from the first capacitor loading branch 50 is that since the second capacitor loading branch 60 is fixed at the bottom edge area of the lens, and the observation range of the human eye is smaller in the vertical direction than in the horizontal direction, the width of the second capacitor loading branch 60 can be greater than the width of the first capacitor loading branch 50 to allow a wider range of tuning, that is, further improving the flexibility of tuning.

In an embodiment of the present application, a first gap is provided at a designated position on the bottom of the annular region 20, and a second gap is provided on the second capacitor loading branch 60 at the same position.

As described above, the first gap of the annular region 20 is usually set at a designated position at the bottom, and considering that a second capacitor loading branch 60 is provided in the bottom edge area of the lens, at the position of the first gap at the bottom of the annular region 20, a second gap is also required to be provided for the second capacitor loading branch 60 to ensure the tuning effect of the first resonance point.

Figure 5:
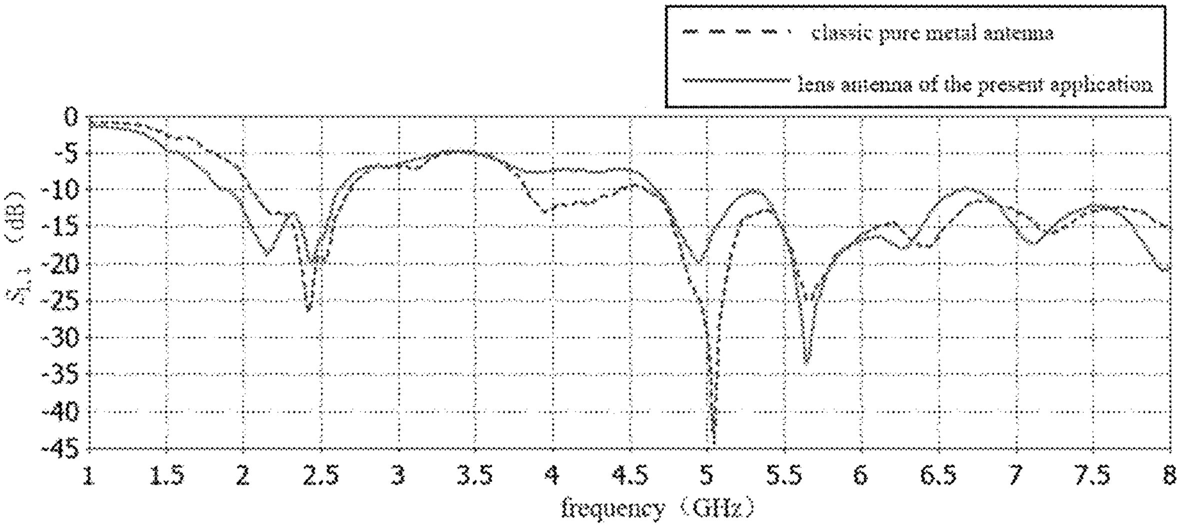
FIG. 5 is a schematic diagram showing how the return loss of a lens antenna according to an embodiment of the present application and a classic pure metal antenna varies with frequency.
Figure 6:
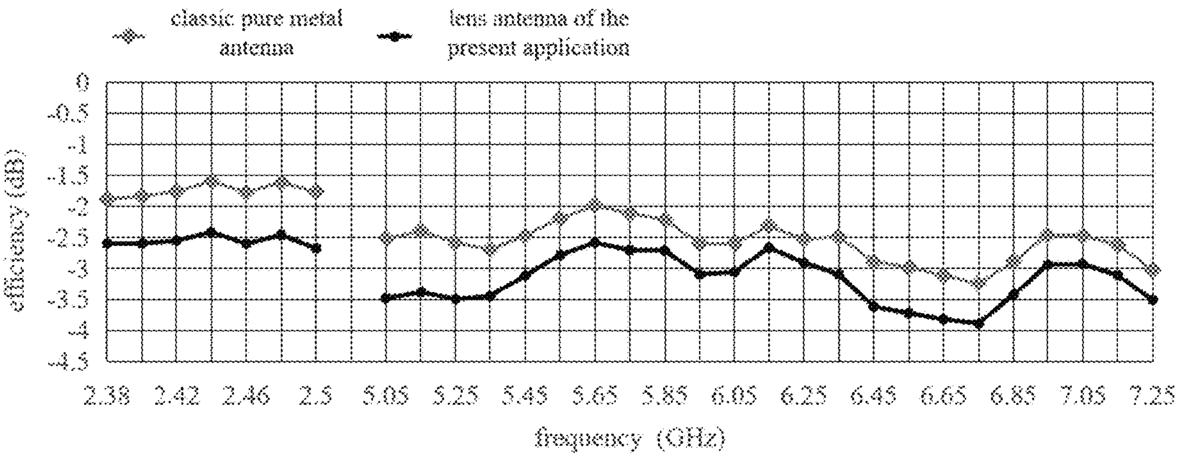
FIG. 6 is a schematic diagram showing how the efficiency of a lens antenna according to an embodiment of the present application and a classic pure metal antenna varies with frequency.

As shown in FIG. 5 and FIG. 6. FIG. 5 is a schematic diagram showing how the return loss of a lens antenna according to an embodiment of the present application and a classic pure metal antenna varies with frequency. It can be seen that the difference in return loss between the two is small. FIG. 6 is a schematic diagram showing how the efficiency of a lens antenna according to an embodiment of the present application and a classic pure metal antenna varies with frequency. It can be seen that the difference in efficiency between the two is also small. Therefore, it can be explained that the lens antenna of the present application has good return loss and high efficiency.

The present application takes into account that the human eye, as a visual organ, usually has an observation range of plus or minus 60 degrees in the horizontal direction and plus or minus 40 degrees in the vertical direction, and that the vision of the human eye decreases rapidly as the angle expands. That is to say, although the human eye can see objects within a wide angle range, the clarity will be greatly reduced. The lens antenna in the solution of the present application is as far away from the optical display area as possible, so that the solution of the present application can retain the original optical properties of the lens as much as possible, which effectively guarantees the visual effect of the user.

Specifically, in the solution of the present application, the annular region 20 is provided around the edge of the lens, which will not affect the optical properties of the lens. There is a capacitive coupling gap between the annular region 20 and the feed sheet 10. The feed sheet 10 can be excited and fed in the first frequency band to excite the annular region 20 to generate a first resonance point. It can be seen that the function of the lens antenna can be realized through the feed sheet 10 and the annular region 20. The feed sheet 10 of the present application is also fixed to the edge area of the lens, so that the optical properties of the lens are little affected, which is conducive to ensuring the visual effect of the user.

In addition, the present application takes into account that the traditional solution uses the entire lens area to design the lens antenna because it is convenient to adjust the shape, size and position of each component so that the designed lens antenna can easily reach the required resonance point. In the solution of the present application, the annular region 20 is limited to be set around the edge of the lens, and the feed sheet 10 also needs to be fixed in the edge area of the lens. In addition, the present application also takes into account that different users require different lens sizes, resulting in different lengths of the annular region 20. Therefore, in order to enable the lens antenna of the present application to reach the required resonance point, the solution of the present application is provided with a first gap at a specified position of the annular region 20, and the position of the first gap will affect the value of the first resonance point. In other words, when the length of the annular region 20 is different due to lenses of different sizes, the solution of the present application can adapt, that is, by selecting a suitable specified position of the annular region 20 to set a first gap, the lens antenna of the present application can still reach the required first resonance point, ensuring the flexibility of the solution.

In summary, the lens antenna of the present application has little effect on the optical properties of the lens, which is beneficial to ensuring the visual effect of the user. Moreover, for lenses of different sizes, the lens antenna of the present application can easily reach the required first resonance point.

Figure 7:
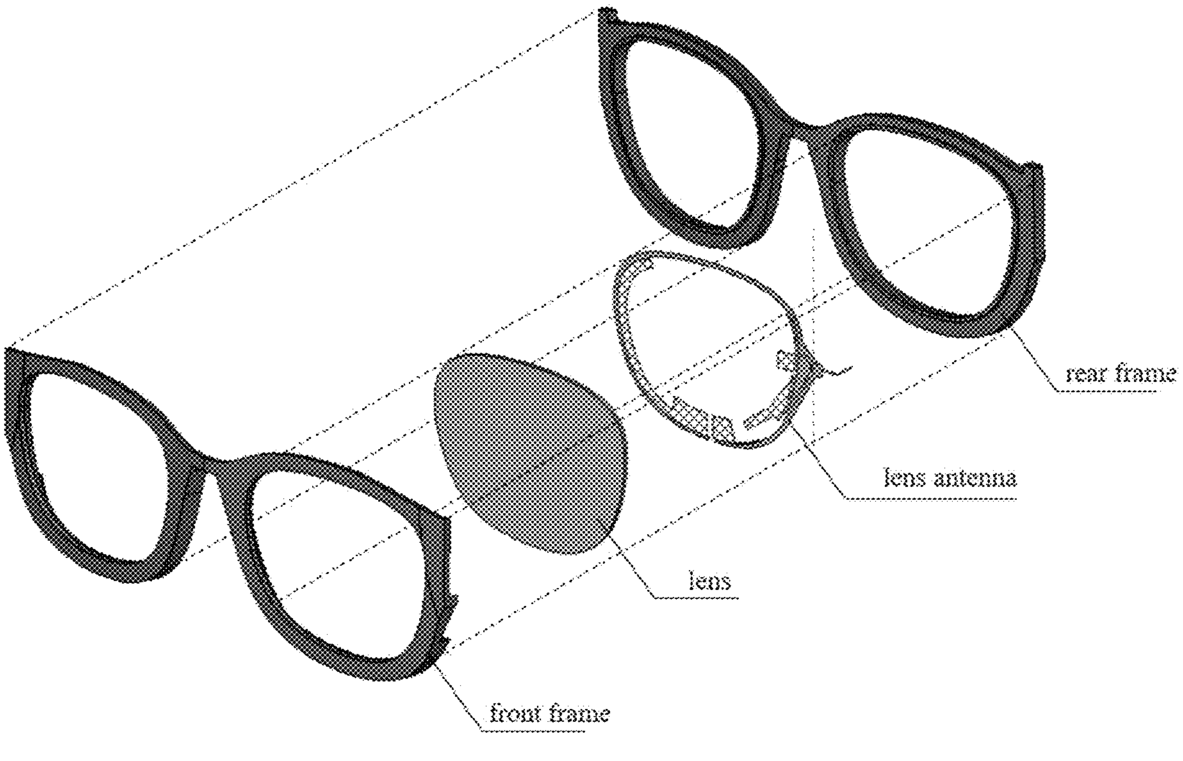
FIG. 7 is an exploded view of glasses according to an embodiment of the present application.

The present application also provides a glasses, which may include the lens antenna in any of the above embodiments. As shown in FIG. 7, which is an exploded view of glasses according to an embodiment, where the lenses and the lens antenna are fixed by the front frame and the rear frame.

In practical applications, the glasses of the present application may generally be the AR glasses mentioned above. In other occasions, the lens antenna of the present application can also be set in other types of glasses.

It should also be noted that, in this article, relational terms such as first and second, etc. are only used to distinguish one entity or operation from another entity or operation, and do not necessarily require or imply any such actual relationship or order between these entities or operations. Moreover, the terms "include" or any other variants thereof are intended to cover non-exclusive inclusion, so that a process, method, article or device including a series of elements includes not only those elements, but also other elements not explicitly listed, or also includes elements inherent to such process, method, article or device. In the absence of further restrictions, the elements defined by the sentence "include a . . . " do not exclude the presence of other identical elements in the process, method, article or device including the elements.

Specific examples are used herein to illustrate the principles and implementation methods of the present application, and the description of the above embodiments is only used to help understand the technical solution and core ideas of the present application. It should be pointed out that for persons skilled in the art, without departing from the principles of the present application, several improvements and modifications can be made to the present application, and these improvements and modifications also fall within the scope of the present application.

What is claimed is:

1. A lens antenna for glasses, comprising:

an annular region provided around an edge of a lens; and a feed sheet configured to perform excitation feeding in a first frequency band to excite the annular region to generate a first resonance point, wherein a capacitive coupling gap is provided between the annular region and the feed sheet, a first gap is provided at a pre-selected position of the annular region, the pre-selected position of the annular region refers to a position allowing the lens antenna to reach a required first resonance point, and the feed sheet is fixed at an edge area of the lens, wherein the feed sheet is strip-shaped, one end of the feed sheet is provided at a side edge area of the lens, and another end of the feed sheet is configured to extend along a side of the lens toward a bottom of the lens, wherein the side edge area of the lens refers to a left/right edge area of the lens in a wearer's horizontal viewing direction, and the bottom of the lens refers to a lower edge area of the lens in a wearer's vertical viewing direction, and wherein a portion of the feed sheet provided at a side edge area of the lens adopts a solid metal conductor structure, and a portion of the feed sheet extending along the side of the lens toward the bottom of the lens adopts a transparent metal grid structure.

2. The lens antenna according to claim 1, wherein the feed sheet is further configured to generate a second resonance point when operating as a monopole in a second frequency band.

3. The lens antenna according to claim 1, further comprising:

a first matching branch connected to the feed sheet and provided in an extension direction of the feed sheet, wherein the first matching branch is the transparent metal grid structure, is fixed to the edge area of the lens, and is configured to perform impedance matching in the first frequency band.

4. The lens antenna according to claim 1, further comprising:

a second matching branch connected to the feed sheet and provided in a direction perpendicular to the extension direction of the feed sheet, wherein the second matching branch is the transparent metal grid structure, is fixed to the edge area of the lens, and is configured to perform impedance matching in the second frequency band; and wherein the feed sheet is further configured to generate a second resonance point when operating as a monopole in the second frequency band.

5. The lens antenna according to claim 1, further comprising:

a first capacitor loading branch connected to the annular region and configured to tune the first resonance point, wherein the first capacitor loading branch is the transparent metal grid structure, is in a strip shape, and is fixed to the side edge area of the lens.

6. The lens antenna according to claim 5, further comprising:

a second capacitor loading branch connected to the annular region and the first capacitor loading branch and configured to tune the first resonance point, wherein the second capacitor loading branch is the transparent metal grid structure, is in the strip shape, and is fixed at a bottom edge area of the lens;

wherein a width of the second capacitor loading branch is greater than a width of the first capacitor loading branch;

wherein a length direction of the first capacitor loading branch is an extension direction of the first capacitor loading branch, and a width direction of the first capacitor loading branch is perpendicular to the length direction of the first capacitor loading branch; and wherein a length direction of the second capacitor loading branch is an extension direction of the second capacitor loading branch, and a width direction of the second capacitor loading branch is perpendicular to a length direction of the second capacitor loading branch.

7. The lens antenna according to claim 6, wherein the first gap is provided at a pre-selected position of a bottom of the annular region, and the second capacitor loading branch is provided with a second gap at the same position.

8. A pair of glasses, comprising:

a lens antenna, wherein the lens antenna comprises an annular region and a feed sheet, the annular region is provided around an edge of a lens, the feed sheet is configured to perform excitation feeding in a first frequency band to excite the annular region to generate a first resonance point, a capacitive coupling gap is provided between the annular region and the feed sheet, a first gap is provided at a pre-selected position of the annular region, the pre-selected position of the annular region refers to a position allowing the lens antenna to reach a required first resonance point, and the feed sheet is fixed at an edge area of the lens, the feed sheet is strip-shaped, one end of the feed sheet is provided at a side edge area of the lens, and another end of the feed sheet is configured to extend along a side of the lens toward a bottom of the lens, the side edge area of the lens refers to a left/right edge area of the lens in a wearer's horizontal viewing direction, and the bottom of the lens refers to a lower edge area of the lens in a wearer's vertical viewing direction, and a portion of the feed sheet provided at the side edge area of the lens adopts a solid metal conductor structure, and a portion of the feed sheet extending along the side of the lens toward the bottom of the lens adopts a transparent metal grid structure.

* * * * *